March 24, 1953 J. SELZ 2,632,792
SYSTEM FOR MEASURING PHASE DISTORTION IN TRANSMISSION
NETWORKS, PARTICULARLY CABLES
Filed Feb. 26, 1948 2 SHEETS—SHEET 1
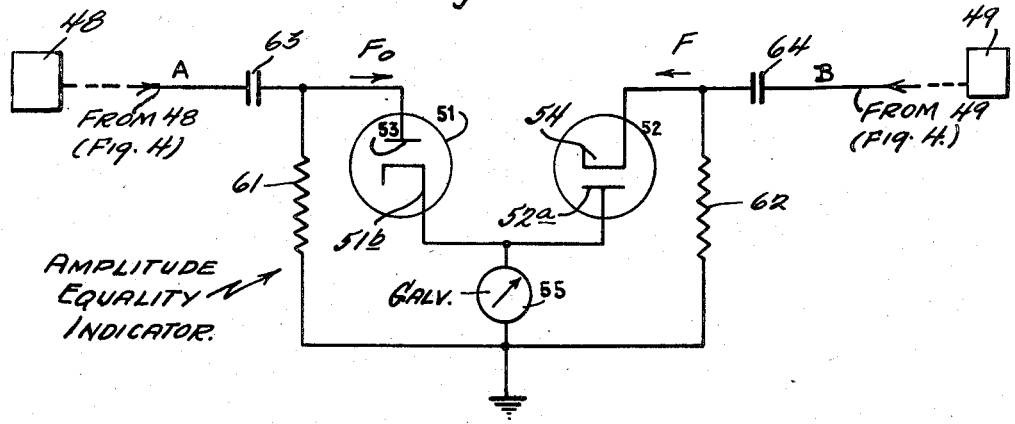
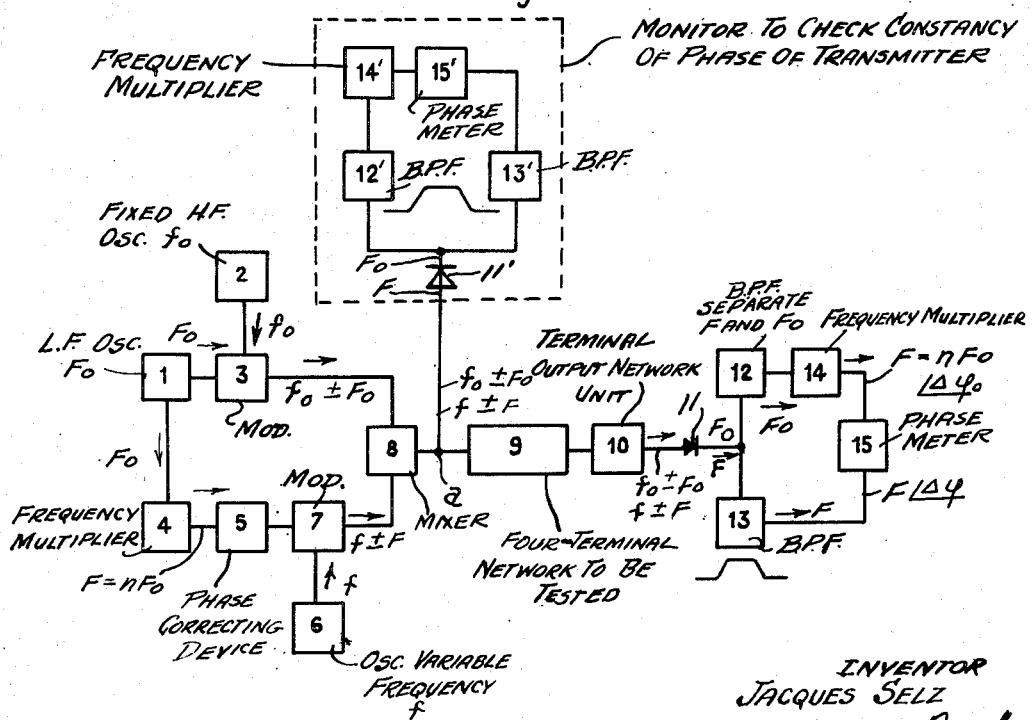
INVENTOR
JACQUES SELZ
By Adams + Bush
ATTORNEYS

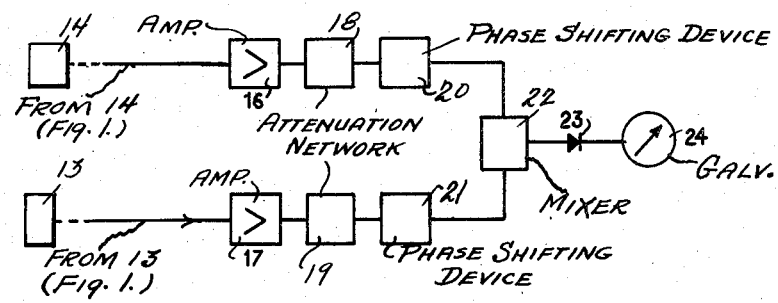
Fig. 2. (PHASE METER 15)
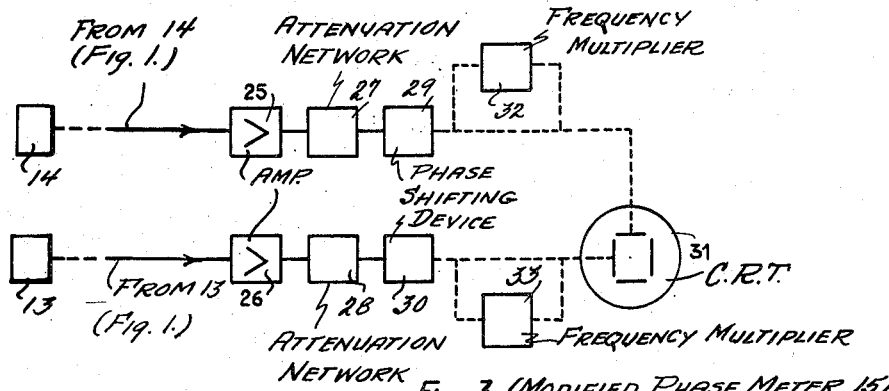
Fig. 3 (MODIFIED PHASE METER 15)
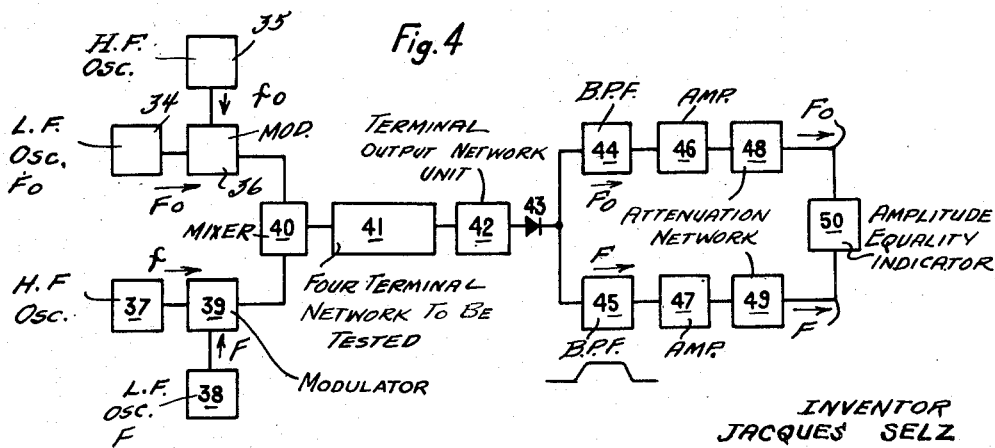
Fig. 4
INVENTOR
JACQUES SELZ
By Adams & Bush
ATTORNEYS Patented Mar. 24, 1953

2,632,792

UNITED STATES PATENT OFFICE 2,632,792

SYSTEM FOR MEASURING PHASE DISTORTION IN TRANSMISSION NETWORKS, PARTICULARLY CABLES

Jacques Selz, Paris, France, assignor to Compagnie Industrielle des Telephones, Paris, France, a corporation of France Application February 26, 1948, Serial No. 11,176
In France January 31, 1947

Section 1, Public Law 690, August 8, 1946
Patent expires January 31, 1967

6 Claims. (Cl. 175—183)

This invention relates to systems for use in the measurement of delay distortion as represented by change in phase and attenuation distortion in four-terminal transmission networks, particularly cables, and comprises an improved system for comparing the propagation times of waves of different frequencies for the purpose of determining the delay distortion of the channel or system and adapted also, if desired, to measure the relative attenuation at different frequencies for the purpose of determining the attenuation distortion of the system over a required range of frequencies.

It is well known in the telecommunication art that the propagation time through a given channel under consideration for a group of waves of any given frequency $f$ can be determined by transmitting an amplitude-modulated wave whose carrier frequency is $f$ and which is modulated at a modulating frequency $F$, through the system under test and measuring the difference of phase $\Delta \varphi$ of the modulating wave of frequency $F$ at the transmitting and receiving ends of the channel or system, the modulating frequency $F$ being small compared with the carrier frequency $f$. The ratio of the differentials $$\frac{d\varphi}{d\omega}$$

(where $\omega = 2\pi f$) is equal to the propagation time $\tau$ of the channel or system for a wave of the carrier frequency $f$. If the modulating frequency $F$ is small enough a mean value $\tau m$ of the propagation time through the channel over a range of frequencies extending from $f-F$, to $f+F$ sufficiently accurate for practical purposes is obtained according to the equation $$\tau m = \frac{\Delta \varphi}{\Delta \omega}$$

The system according to the present invention is arranged to transmit two amplitude modulated waves of different carrier frequencies $f_0$ and $f$ through a four terminal network under test, the two carrier waves being respectively modulated with two modulating frequencies $F_0$ and $F$ one of which is a multiple of the other, and comprises means for demodulating the waves at the output end of the test network and for separating the two modulating frequencies $F_0$ and $F$ thus obtained after demodulation, a frequency multiplier arranged to convert the lower frequency $F_0$ so obtained to the higher frequency $F$, and means for measuring the difference of phase between the waves of equal frequency thus obtained. From the difference of phase $\psi$ thus measured, the difference between the transmission time $\tau m$ through the test channel for a wave of any carrier frequency $f$ and the transmission time $\tau m_0$ for a wave of reference frequency $f_0$ can be determined according to the equation:

$$\Delta \tau = \tau m - \tau m_0 = \frac{\psi}{2\pi F}$$

To ensure accuracy in the phase relation between the two modulating frequencies $F_0$ and $F$ at the transmitting end, these two frequencies are preferably obtained from a single generator, one of the frequencies being derived from the generator generating the carrier frequency by means of a fequency-multiplier.

The system may be adapted for measuring differences of attenuation at different frequencies by transmitting two amplitude-modulated waves of different carrier frequencies through the system under test, means being provided for demodulating the waves at the receiving end and for separating the reconstituted modulation frequencies and measuring their relative amplitude.

The nature of the invention and of the features thereof and the manner in which the same is to be performed will be understood from the following detailed description, given by way of example, of systems arranged according to the present invention, reference being made to the accompanying drawings in which:

Figure 1 is a schematic diagram of an arrangement for measuring the delay distortion of a transmission cable, Figure 2 is a diagram of a first phase-difference measuring apparatus for use in the arrangement of Fig. 1, Figure 3 is a diagram of a modified arrangement of phase-difference measuring apparatus using a cathode ray tube for use in the arrangement of Fig. 1, Figure 4 is a schematic diagram of a simplified installation for measuring differences of attenuation, and Figure 5 shows a differential detector suitable for use in the system shown in Figure 4.

In Figure 1, the circuit element 1 is a low frequency oscillator adapted to produce a modulating alternating current of frequency $F_0$, which is used in the modulator 3 to amplitude-modulate a high frequency oscillation of fixed frequency $f_0$ generated by a high frequency oscillator 2. The modulating frequency $F_0$ obtained from the oscillator 1 is also applied to frequency multiplier 4 by which a frequency $F=nF_0$ is obtained. This current of frequency F is so obtained through the medium of a phase correcting device 5 to a modulator 7 in which it is used to amplitude-modulate an oscillation of variable frequency $f$ produced by a high frequency generator 6. The oscillators, modulators, multipliers, and other units just mentioned are all at the input end of the cable or network under test.

The two modulated waves are mixed in a mixing stage 8 and applied to the input terminals of a four-terminal network 9 to be tested.

The output terminal circuit 10 of the quadripoles or network 9 is immediately followed by a non-selective detector 11 which is connected to two band filters 12 and 13 in parallel designed to separate the so detected two modulation frequencies F and $F_0$. The frequency $F_0$ of the current which is received by the filter 12, is multiplied by the factor $n$ by means of a frequency-multiplier 14 so that two waves of the same frequency are obtained at the outputs of the elements 13 and 14 respectively. These two currents of phase and frequencies $$F\underline{|\Delta\Psi_0} \text{ and } F\underline{|\Delta\Psi}$$

are relatively displaced in phase by the phase angle, $\psi=\Delta\varphi-\Delta\varphi_0$. This difference of phase is measured by a phase-meter 15.

Generally the modulator 7 and the mixer 8 will introduce group-frequency transmission delays which are variable as a function of the variable frequency $f$ of oscillator 6. To eliminate this cause of error, the phase-corrector 5 is arranged to effect a phase correction such as to maintain a constant phase relation between the waves applied to the transmitting end of the test quadripole or network 9. This constant phase relation is checked by means of a monitor system consisting of a detector 11', filters 12' and 13', a frequency-multiplier 14' and a phase-meter 15', which correspond to the circuit elements 11, 12, 13, 14 and 15 respectively and which operate in the same way.

Figure 2 illustrates the preferred arrangement of the phase-meter 15. It comprises a pair of amplifiers 16 and 17 arranged to receive the outputs of frequency F at the phase angles as mentioned from the frequency-multiplier 14 and filter 13 respectively. The output from the amplifier 16 passes through an attenuating device 18 and a calibrated phase-shifting device 20 while the output from the amplifier 17 passes through an attenuating device 19 and a calibrated phase-shifting device 21. The outputs from the phase-shifting devices 20 and 21 are united in a mixer 22; the mixed wave is demodulated by a detector 23, and the demodulated output is applied to an indicating instrument 24 such as a galvanometer. As adjustment is made of the attenuating devices 18 and 19 and the calibrated phase-shifting devices 20 and 21 so that the instrument 24 gives a null indication; and the resultant change of phase angle $\psi$ can then readily be deduced from the readings of the phase-shifting devices 20 and 21 after such adjustment.

Figure 3 represents another example of a phase-measuring apparatus 15 in which an oscillograph is used. In this arrangement of the outputs of frequency F at the phase angles as mentioned from the filter 13 and frequency-multiplier 14 respectively are passed through amplifiers 25 and 26 respectively to two adjustable attenuating devices 27 and 28 and thence through two calibrated phase-shifting devices 29 and 30. The output from one of the phase-shifting devices 29 and 30 is applied to the horizontal deflecting plates of a cathode-ray tube 31 and the output from the other phase-shifting device is applied to the vertical deflecting plates of the cathode-ray tube. When these two outputs have been brought into phase or into phase opposition by adjustment of the phase-shifting devices 29 and 30, the trace on the screen of the cathode-ray tube 31 takes the form of a straight line and the settings of the phase-shifting devices are thend read to determine the change of phase which has resulted. This arrangement is more rapid in use than the null indicating arrangement described with reference to Figure 2 because it is not necessary to obtain exact equality of amplitude between the outputs obtained from the two phase-shifting devices 29 and 30. However, owing to the size of the spot of the cathode ray tube, it is not possible with this arrangement to observe small differences of phase less than say one degree.

The invention includes an arrangement for increasing the accuracy of measurement by multiplying the frequencies F by the same factor $p$ by means of frequency-multipliers. In Figure 3, the rectangles 32 and 33 indicate frequency-multipliers inserted between the phase-shifting devices 29 and 30 and the input terminals of the oscillograph 31 for the purpose of increasing the accuracy of the results obtainable. If the frequency-multiplying factor $p$ is 5, for example, the phase difference at the frequency F can be measured to within 0.2 degree if the difference of phase at the frequency $pf$ can be read to an accuracy of within one degree.

Referring to Figures 1 and 2, it will be observed that the attenuating devices 18 and 19 can be used to compare the attenuations of the reference frequency and variable frequency waves $f_0$ and $f$ respectively by noting the adjustments of the attenuating devices necessary to obtain a null indication in the instrument 24. In order to obtain an effective measurement in this way, it is essential to ensure that the mean amplitude and modulation factor of the variable frequency wave applied to the transmitting end of the network 9 is constant and that the attenuation due to the phase-adjusting devices used does not vary with adjustment of the latter. These requirements can readily be satisfied by methods known in the art.

Figure 4 shows an example of a system according to the invention arranged to measure differences of attenuation without regard to the differences in the propagation times of the wave envelopes. The apparatus is simplified as compared with that shown in Figures 1 and 2, as the frequencies F and $F_0$ do not have to be multiples of one another. In Figure 4 the circuit element 34 is a low-frequency oscillator which generates the frequency $F_0$ applied to a modulator 36 by which a fixed frequency $f_0$ generated by a high-frequency oscillator 35 is modulated. The circuit element 37 is another high-frequency oscillator for producing a variable frequency $f$ which is modulated in a modulator 39 by a modulating frequency F produced by a generator 38. By means of a mixer 40, the two modulated waves are applied to the transmitting end of a network 41 which terminates in a circuit 42. A detector 43 and a pair of filters 44 and 45 are arranged to detect the two carrier frequencies $F_0$ and F and to separate them. The output from the filter 44 is passed through an amplifier 46 and attenuating device 48 for the frequency $F_0$ and the output from the filter 45 is passed through an amplifier 47 and attenuating device 49 for the frequency F. The rectangle 50 represents a circuit arrangement designed to indicate when the outputs from the attenuating devices 48 and 49 are equal in amplitude, this equality of amplitude being obtainable by adjustment of the attenuating devices 48 and 49.

Figure 5 represents an example of a suitable form of the apparatus 50 of Figure 4, using a differential detector.

The detector shown in Figure 5 consists essentially of two diodes 51 and 52. The detector circuit is connected at the points A and B respectively to the outputs of the attenuating devices 48 and 49 of Figure 4 so that the frequency $F_0$ is applied to the anode 53 of the diode 51 whilst the frequency F is applied to the cathode of the diode 52. The direct-current components of the rectified currents pass in opposite directions through the galvanometer 55. To obtain a reading, the attenuating devices 48 and 49 of Figure 4 are adjusted to obtain a null indication of the galvanometer 55, and the difference between the attenuations of the waves F and $F_0$ is deduced from the adjustments of the attenuating devices. A measure of the difference of attenuation in the system under test at the frequencies $f$ and $f_0$ respectively is thus obtained.

I claim:

1. In a phase measurement circuit for measuring the displacement of phase during transmission through a quadripole, input terminals and output terminals for connection of a test quadripole, a first carrier oscillator producing a first carrier output of fixed frequency, a second carrier oscillator producing a second carrier output of variable frequency, a low-frequency oscillator producing a first modulating frequency, a source of a second modulating frequency which is a multiple of said first modulating frequency, a first modulator having carrier input terminals connected to said first carrier oscillator and further having modulating input terminals connected to said low frequency oscillator, a second modulator having carrier input terminals connected to said second carrier oscillator and also having modulating input terminals, an adjustable phase shifting device connected between said source and the modulating input terminals of said second modulator, a mixer unit having input terminals connected to the output terminals of said modulators, and further having output terminals connected to said input terminals, a detector having input terminals connected to said output terminals, a first principal band filter adapted to select said first modulating frequency, a second principal band filter adapted to select said second modulating frequency, the input terminals of said filters being connected to the output terminals of said detector, a principal frequency multiplier having input terminals connected to the output terminals of said first band filter and being adapted when so connected to deliver at its output terminals an output of said second modulating frequency, and a principal phase measuring device having a first set of input terminals and a second set of input terminals connected respectively to the output terminals of said principal frequency multiplier and to the output terminals of said second principal band filter and adapted to indicate the phase relations between the two inputs so applied respectively to its said two sets of input terminals.

2. A phase measurement circuit according to claim 1, said source being a principal frequency multiplier having input terminals connected to said low frequency oscillator and further having output terminals connected to said phase shifting device.

3. A phase measurement circuit according to claim 1, and phase monitoring means connected to said input terminals for checking the phase relations of said first modulating frequency and said second modulating frequency as applied to said input terminals, said phase monitoring means comprising an auxiliary detector having its input connected to said input terminals, a first auxiliary band filter adapted to select said first modulating frequency, a second auxiliary band filter adapted to select said second modulating frequency, the input terminals of said auxiliary filters being connected to the output terminals of said auxiliary detector, an auxiliary frequency multiplier having input terminals connected to the output terminals of said first auxiliary band filter, and being adapted when so connected to deliver at its output terminals an output of said second modulating frequency, and an auxiliary phase measuring device having a first set of input terminals and a second set of input terminals connected respectively to the output terminals of said auxiliary frequency multiplier and to the output terminals of said second auxiliary band filter and adapted to indicate the phase relations between the two inputs so applied respectively to its said two sets of input terminals.

4. A phase measurement circuit according to claim 1, said principal phase measuring device comprising a first attenuator having input terminals connected to the output terminals of said principal frequency multiplier and further comprising a second attenuator having input terminals connected to the output terminals of said second principal band filter, a secondary adjustable phase shifting device having input terminals connected to the output terminals of said first attenuator, a tertiary adjustable phase shifting device having input terminals connected to the output terminals of said second attenuator, a cathode ray oscillograph having a vertical set of plates and a horizontal set of plates, the output terminals of said secondary phase shifting device being connected to one said set of plates and the output terminals of said tertiary phase shifting device being connected to the other said set of plates.

5. A phase measurement circuit according to claim 4, and a pair of precision frequency multipliers respectively inserted between each of said secondary and tertiary phase shifting devices and a corresponding said set of plates.

6. An arrangement for the measurement of the difference between the phase delays caused by a quadripole on two frequencies $f$ and $f_0$, comprising input terminals and output terminals for connection of a test quadripole, a first generator producing a fixed frequency $f_0$ modulated by a frequency $F_0$ and a second generator producing a variable frequency $f$ modulated by a frequency F different from $F_0$, means for applying simultaneously these two modulated frequencies to said input terminals, a non-selective detector connected to said output terminals to demodulate said frequencies, two band filters connected to the output of said detector and separating the demodulated components $F_0$ and $F$ taken off at the output of said detector, means for transforming the frequency of the one of the two said components into a frequency equal to the frequency of the other component, and a differential phase-measuring device having two pairs of input terminals, one pair of input terminals being connected to the output of the detector, and the other pair of input terminals being connected to the output of said frequency transforming means.

JACQUES SELZ.

REFERENCES CITED

The following references are of record in the file of this patent:

UNITED STATES PATENTS

| Number | Name | Date |
|---|---|---|
| 1,645,618 | Nyquist | Oct. 18, 1927 |
| 2,047,782 | Jensen | July 14, 1936 |
| 2,214,130 | Green et al. | Sept. 10, 1940 |
| 2,285,038 | Loughlin | June 2, 1942 |
| 2,324,215 | Kinsburg | July 13, 1943 |
| 2,337,540 | Burgess | Dec. 28, 1943 |
| 2,337,541 | Burgess | Dec. 28, 1943 |
| 2,364,190 | Burgess | Dec. 5, 1944 |
| 2,401,411 | Carlisle, Jr. | June 4, 1946 |